US012684442B2

(12) United States Patent
Awada et al.

(10) Patent No.: US 12,684,442 B2
(45) Date of Patent: Jul. 14, 2026

(54) REDUCING HANDOVER INTERRUPTION TIME USING SIDELINK COMMUNICATION

(71) Applicant: Nokia Technologies Oy, Espoo (FI)

(72) Inventors: Ahmad Awada, Munich (DE);
Berthold Panzner, Munich (DE);
Stepan Kucera, Munich (DE)

(73) Assignee: Nokia Technologies Oy, Espoo (FI)

( * ) Notice: Subject to any disclaimer, the term of this patent is extended or adjusted under 35 U.S.C. 154(b) by 333 days.

(21) Appl. No.: 18/579,360

(22) PCT Filed: Jun. 29, 2022

(86) PCT No.: PCT/EP2022/067867
§ 371 (c)(1),
(2) Date: Jan. 14, 2024

(87) PCT Pub. No.: WO2023/285144
PCT Pub. Date: Jan. 19, 2023

(65) Prior Publication Data
US 2024/0323775 A1        Sep. 26, 2024

Related U.S. Application Data

(60) Provisional application No. 63/221,665, filed on Jul. 14, 2021.

(51) Int. Cl.
*H04W 36/18*        (2009.01)
*H04W 36/00*        (2009.01)
*H04W 74/0833*      (2024.01)
(52) U.S. Cl.
CPC ..... *H04W 36/185* (2023.05); *H04W 36/0069* (2018.08); *H04W 36/03* (2018.08); *H04W 36/037* (2023.05); *H04W 74/0833* (2013.01)

(58) Field of Classification Search
CPC ............. H04W 36/0069; H04W 36/03; H04W 36/037; H04W 36/185; H04W 74/0833; H04W 88/04
See application file for complete search history.

(56) References Cited

U.S. PATENT DOCUMENTS 11,924,696 B2      3/2024    Talukdar
2017/0215119 A1    7/2017    Hong et al.
(Continued)

FOREIGN PATENT DOCUMENTS

WO      WO-2017149361 A1 *  9/2017   ........ H04W 36/0235
WO      2022/042948 A1     3/2022

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.
(Continued)

*Primary Examiner* — Elton Williams
(74) *Attorney, Agent, or Firm* — Robert P. Michal, Esq.; Rimon PC

(57)        ABSTRACT
Systems, methods, apparatuses, and computer program products for reducing handover interruption time using sidelink communication are provided. For example, the handed-over (remote) user equipment may exchange uplink and downlink data with the target cell via the additional or assisting link to another relay user equipment while the remote user equipment performs the random access procedure (random access channel procedure) and may establish its own direct radio link to the target cell.

8 Claims, 12 Drawing Sheets

(56) References Cited

U.S. PATENT DOCUMENTS

2019/0223066 A1\*  7/2019  Xu ..................... H04W 36/0058
2021/0195613 A1     6/2021  Agiwal et al.

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
"3rd Generation Partnership Project; Technical Specification Group Radio Access Network; NG-RAN; Xn application protocol (XnAP) (Release 16)", 3GPP TS 38.423, V16.5.0, Apr. 2021, pp. 1-461.
"3rd Generation Partnership Project; Technical Specification Group Radio Access Network; Study on NR sidelink relay; (Release 17)", 3GPP TR 38.836, V17.0.0, Mar. 2021, pp. 1-26.
"Clarification on LTE DAPS and sidelink on 36.300", 3GPP TSG-RAN WG2 Meeting #114-e, R2-2105587, Huawei, May 19-27, 2021, 4 pages.
"Clarification on LTE DAPS and sidelink on 36.300", 3GPP TSG-RAN WG2 Meeting # 113bis-e, R2-2104107, Huawei, Apr. 12-20, 2021, 4 pages.
"Miscellaneous corrections on TS 36.331 for NR V2X", 3GPP TSG-RAN WG2 Meeting #114-e, R2-2105588, Huawei, May 19-27, 2021, 17 pages.
"CR on co-configuration of Rel-16 features", 3GPP TSG-RAN2 Meeting #113-E, R2-2102411, OPPO, Jan. 2021, 7 pages.
Invitation to Pay Additional Fees received for corresponding Patent Cooperation Treaty Application No. PCT/EP2022/067867, dated Nov. 2, 2022, 12 pages.
"Handover interruption time reduction using sidelink communication", 3GPP TSG-RAN WG2 Meeting #115 Electronic, R2-2108464, Agenda: 8.7.3.2, Nokia, Aug. 16-27, 2021, 3 pages.
"Service continuity of L2 U2N relay", 3GPP TSG RAN WG2 Meeting #114-e, R2-2104739, Agenda: 8.7.4.2, Qualcomm Incorporated, May 19-27, 2021, 12 pages.
"Sidelink Relay Enhancements or R 18", 3GPP Ran Rel-18 Workshop, RWS-210427, Agenda: 4.2, InterDigital, Jun. 28-Jul. 2, 2021, pp. 1-5.
"Reconfiguration during DAPS HO", 3GPP TSG-RAN WG2 Meeting #114-e, R2-2104934, Ericsson, May 19-27, 2021, 8 pages.
International Search Report and Written Opinion received for corresponding Patent Cooperation Treaty Application No. PCT/EP2022/067867, dated Feb. 16, 2023, 22 pages.
"Motivation of Mobility enhancement for FR1 and FR2 in R18", 3GPP TSG RAN Rel-18 workshop, RWS-210384, Agenda: 4.1, China Unicorn, Jun. 28-Jul. 2, 2021, 5 pages.
"Stage-2 CR for introduction of even further mobility enhancement in E-UTRAN", 3GPP TSG-RAN2 Meeting #109, R2-2001653, China Telecom, Feb. 24-28, 2020, 35 pages.

\* cited by examiner

Figure 6:
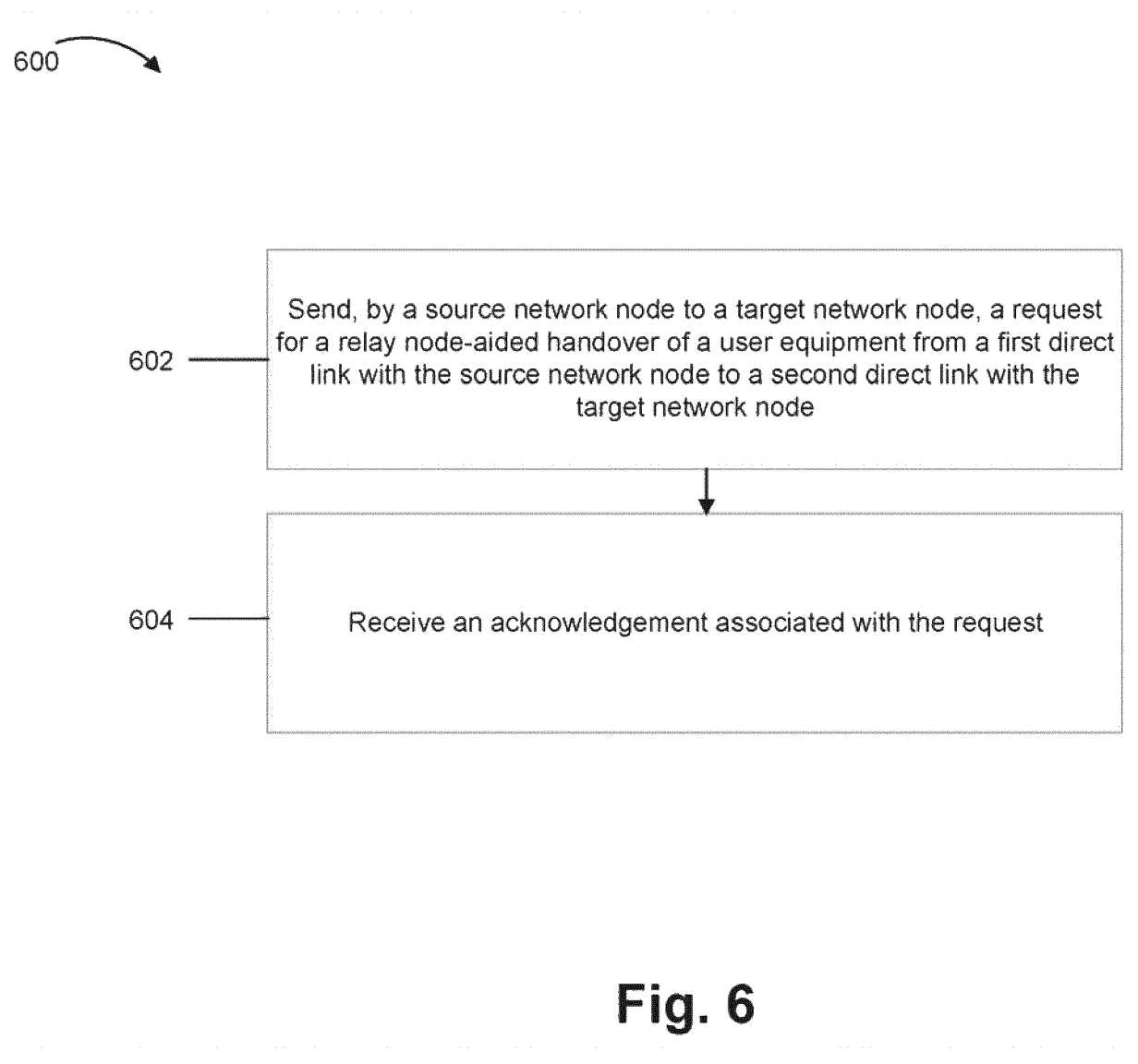

600

602 — Send, by a source network node to a target network node, a request for a relay node-aided handover of a user equipment from a first direct link with the source network node to a second direct link with the target network node 604 — Receive an acknowledgement associated with the request

702 — Receive, by a target network node from a source network node, a request for a relay node-aided handover of a user equipment from a first direct link with the source network node to a second direct link with the target network node 704 — Send, to the source network node, a command to perform the relay node-aided handover

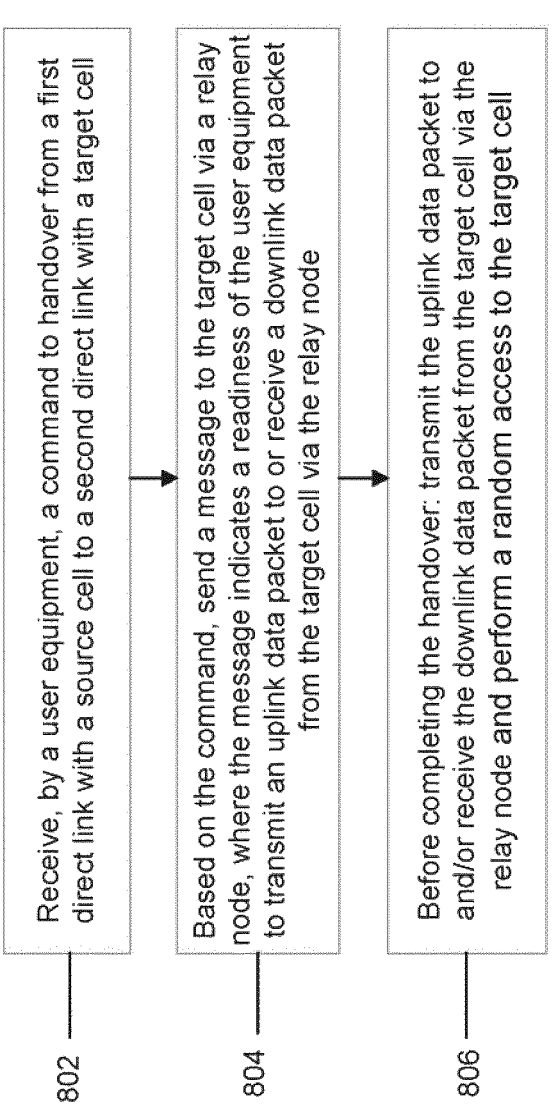

Receive, by a user equipment, a command to handover from a first direct link with a source cell to a second direct link with a target cell Based on the command, send a message to the target cell via a relay node, where the message indicates a readiness of the user equipment to transmit an uplink data packet to or receive a downlink data packet from the target cell via the relay node Before completing the handover: transmit the uplink data packet to and/or receive the downlink data packet from the target cell via the relay node and perform a random access to the target cell

REDUCING HANDOVER INTERRUPTION TIME USING SIDELINK COMMUNICATION

RELATED APPLICATION

This application was originally filed as PCT Application No. PCT/EP2022/067867, filed on Jun. 29, 2022, which claims priority from U.S. Provisional Application No. 63/221,665, filed on Jul. 14, 2021, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for reducing handover interruption time using sidelink communication.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G can be built on a new radio (NR), but a 5G network can also be built on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or evolved Node B (eNB) in LTE) may be named next generation Node B (gNB) when built on NR radio and may be named next generation eNB (NG-eNB) when built on E-UTRA radio. A user equipment in a wireless communication system may handover from a cell to another cell, e.g., due to mobility.

SUMMARY

According to a first embodiment, an apparatus may include at least one processor and at least one memory including computer program code. The at least one memory and the computer program code may be configured to, with the at least one processor, cause the apparatus at least to receive a command to handover from a first direct link with a source cell to a second direct link with a target cell. The at least one memory and the computer program code may be configured to, with the at least one processor, cause the apparatus at least to, based on the command, send a message to the target cell via a relay node. The message may indicate a readiness of the apparatus to transmit an uplink data packet to or receive a downlink data packet from the target cell via the relay node. The at least one memory and the computer program code may be configured to, with the at least one processor, cause the apparatus at least to, before completing the handover: transmit the uplink data packet to and/or receiving the downlink data packet from the target cell via the relay node, and perform a random access to the target cell.

In a variant, the message may comprise an identifier for the apparatus. In a variant, the at least one memory and the computer program code may be configured to, with the at least one processor, further cause the apparatus, when transmitting the uplink data packet to the target cell, at least to start transmission prior to initiating a random access procedure to the target cell. In a variant, the at least one memory and the computer program code may be configured to, with the at least one processor, further cause the apparatus at least to detach from the source cell when the apparatus is ready to send the message to the target cell. In a variant, the at least one memory and the computer program code may be configured to, with the at least one processor, further cause the apparatus at least to communicate with the target cell using both the second direct link with the target node and a sidelink via the relay node, after completing the handover.

In a variant, the at least one memory and the computer program code are configured to, with the at least one processor, further cause the apparatus, at least to perform the following after completing the handover: stop the transmitting of the uplink data packet to and/or the receiving of the downlink data packet from the target cell via the relay node, and communicate with the target cell on the second direct link. In a variant, the at least one memory and the computer program code are configured to, with the at least one processor, further cause the apparatus at least to establish a sidelink with the relay node before an execution condition of the handover is met or before sending the message. In a variant, the at least one memory and the computer program code may be configured to, with the at least one processor, further cause the apparatus at least to inform the source cell if the apparatus fails to establish a sidelink with the relay node or if the sidelink with the relay node becomes unavailable before the execution condition of the handover is met.

According to a second embodiment, an apparatus may include at least one processor and at least one memory including computer program code. The at least one memory and the computer program code may be configured to, with the at least one processor, cause the apparatus at least to send, to a target network node, a request for a relay node-aided handover of a user equipment from a first direct link with the apparatus to a second direct link with the target network node. The at least one memory and the computer program code may be configured to, with the at least one processor, cause the apparatus at least to receive an acknowledgement associated with the request.

In a variant, the at least one memory and the computer program code may be configured to, with the at least one processor, further cause the apparatus at least to receive information related to a sidelink between the user equipment and the relay node from the user equipment, and include the information in the request.

According to a third embodiment, an apparatus may include at least one processor and at least one memory including computer program code. The at least one memory and the computer program code may be configured to, with the at least one processor, cause the apparatus at least to receive, from a source network node, a request for a relay node-aided handover of a user equipment from a first direct link with the source network node to a second direct link with the apparatus. The at least one memory and the computer program code may be configured to, with the at least one processor, cause the apparatus at least to send, to the source network node, a command to perform the relay node-aided handover.

In a variant, the at least one memory and the computer program code may be configured to, with the at least one processor, further cause the apparatus, when sending the command, at least to send the command in a target cell configuration message. In a variant, the command may comprise a list of candidate relay nodes for the user equipment to choose for the relay node-aided handover. In a variant, the at least one memory and the computer program code may be configured to, with the at least one processor, further cause the apparatus at least to receive an indication from the user equipment via the relay node prior to receiving a random access message from the user equipment. The indication may indicate that the user equipment is ready for data packet communication with the apparatus via the relay node. In a variant, the at least one memory and the computer program code may be configured to, with the at least one processor, further cause the apparatus at least to, based on the indication, transmit a downlink data packet to the user equipment via the relay node and/or receive an uplink data packet from the user equipment via the relay node, prior to completion of the handover. In a variant, the at least one memory and the computer program code may be configured to, with the at least one processor, further cause the apparatus at least to switch user plane data packet transmission for the user equipment from a link via the relay node to the direct link with the user equipment, after receiving a message from the user equipment indicating completion of the handover. In a variant, the at least one memory and the computer program code may be configured to, with the at least one processor, further cause the apparatus at least to send a request to the relay node for assistance during the relay node-aided handover.

According to a fourth embodiment, a method may include receiving, by a user equipment, a command to handover from a first direct link with a source cell to a second direct link with a target cell. The method may include, based on the command, sending a message to the target cell via a relay node. The message may indicate a readiness of the user equipment to transmit an uplink data packet to or receive a downlink data packet from the target cell via the relay node. The method may include, before completing the handover: transmitting the uplink data packet to and/or receiving the downlink data packet from the target cell via the relay node, and performing a random access to the target cell.

In a variant, the message may comprise an identifier for the user equipment. In a variant, the transmitting of the uplink data packet to the target cell may comprise starting transmission prior to initiating a random access procedure to the target cell. In a variant, the method may further include detaching from the source cell when the user equipment is ready to send the message to the target cell. In a variant, the method may include communicating with the target cell using both the second direct link with the target node and a sidelink via the relay node, after completing the handover. In a variant, the method may further comprise performing the following after completing the handover: stopping the transmitting of the uplink data packet to and/or the receiving of the downlink data packet from the target cell via the relay node, and communicating with the target cell on the second direct link. In a variant, the method may further comprise establishing a sidelink with the relay node before an execution condition of the handover is met or before sending the message. In a variant, the method may further comprise informing the source cell if the user equipment fails to establish a sidelink with the relay node or if the sidelink with the relay node becomes unavailable before the execution condition of the handover is met.

According to a fifth embodiment, a method may include sending, by a source network node to a target network node, a request for a relay node-aided handover of a user equipment from a first direct link with the source network node to a second direct link with the target network node. The method may include receiving an acknowledgement associated with the request.

In a variant, the method may further include receiving information related to a sidelink between the user equipment and the relay node from the user equipment, and including the information in the request.

According to a sixth embodiment, a method may include receiving, by a target network node from a source network node, a request for a relay node-aided handover of a user equipment from a first direct link with the source network node to a second direct link with the target network node. The method may include sending, to the source network node, a command to perform the relay node-aided handover.

In a variant, the sending of the command may include sending the command in a target cell configuration message. In a variant, the command may include a list of candidate relay nodes for the user equipment to choose for the relay node-aided handover. In a variant, the method may further include receiving an indication from the user equipment via the relay node prior to receiving a random access message from the user equipment. In a variant, the indication may indicate that the user equipment is ready for data packet communication with the target network node via the relay node. In a variant, the method may include, based on the indication, transmitting a downlink data packet to the user equipment via the relay node and/or receiving an uplink data packet from the user equipment via the relay node, prior to completion of the handover. In a variant, the method may further include switching user plane data packet transmission for the user equipment from a link via the relay node to the direct link with the user equipment, after receiving a message from the user equipment indicating completion of the handover. In a variant, the method may include sending a request to the relay node for assistance during the relay node-aided handover.

A seventh embodiment may be directed to an apparatus that may include circuitry configured to cause the apparatus to perform the method according to the fourth embodiment, the fifth embodiment, or the sixth embodiment, or any of the variants discussed above.

An eighth embodiment may be directed to an apparatus that may include means for performing the method according to the fourth embodiment, the fifth embodiment, or the sixth embodiment, or any of the variants discussed above. Examples of the means may include one or more processors, memory, and/or computer program codes for causing the performance of the operation.

A ninth embodiment may be directed to a computer readable medium comprising program instructions stored thereon for causing an apparatus to perform at least the method according to the fourth embodiment, the fifth embodiment, or the sixth embodiment, or any of the variants discussed above.

A tenth embodiment may be directed to a computer program product encoding instructions for causing an apparatus to perform at least the method according to the fourth embodiment, the fifth embodiment, or the sixth embodiment, or any of the variants discussed above.

BRIEF DESCRIPTION OF THE DRAWINGS

For proper understanding of example embodiments, reference should be made to the accompanying drawings, wherein:

FIG. 6 illustrates an example flow diagram of a method, according to some embodiments;

FIG. 8 illustrates an example flow diagram of a method, according to some embodiments;

DETAILED DESCRIPTION

Figure 1:
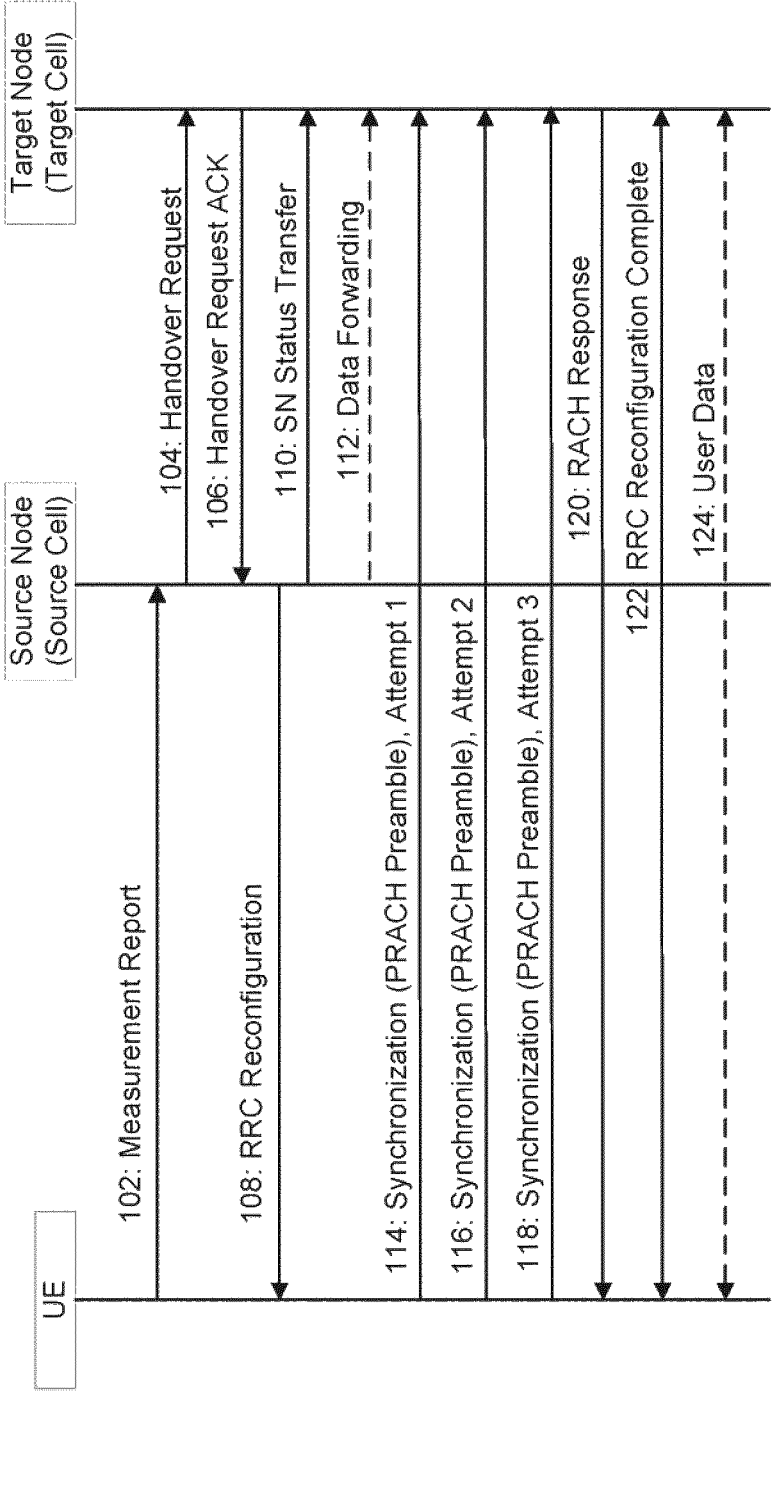
FIG. 1 illustrates an example signal diagram where interruption time occurs during a handover.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for reducing handover interruption time using sidelink communication is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar wording, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar wording, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Some wireless communication system supports sidelink communication where a user equipment can communicate directly with another user equipment. Sidelink use cases may relate to Internet of Things (IoT) and automotive industries (e.g., for reduction of accident risk and safer driving experiences). These use cases may include a message exchange among vehicles (V2V), vehicles and pedestrians (V2P), vehicles and infrastructure (V2I) and vehicles and networks (V2N), and may be referred to as vehicle-to-everything (V2X). The allocation of V2V resources in cellular, i.e., time and frequency resources, can be either controlled by the cellular network structure or performed autonomously by the individual vehicles. Sidelink may use different carrier frequencies or frequency bands than cellular communication.

Sidelink relay may include sidelink-based UE-to-network relay where a relay UE relays traffic between a remote UE and the network, or sidelink-based UE-to-UE relay where a relay UE relays the traffic between a first remote UE (e.g., source UE) and a second remote UE (e.g., destination UE). Sidelink may utilize user and control plane protocol stacks for layer 2 (L2) UE-to-network relay.

User equipment in a wireless communication system may handover from a cell to another cell, e.g., due to mobility. Non-conditional handover, conditional handover (CHO) or dual active protocol stack (DAPS) handover may be configured for the user equipment. With CHO, a configured event may trigger the UE to send a measurement report. Based on this report, a source node can prepare one or more target cells for the same UE, or multiple target nodes for the (conditional) handover. The source node sends a CHO Request to one or more target nodes, and the target nodes send a CHO Request Acknowledge (ACK) in response. Then the source node may send a radio resource control (RRC) reconfiguration (CHO command) to the UE. In case of the non-conditional HO, the UE may access the target cell to complete the handover immediately after the reception of the handover command. Instead, in case of the CHO, the UE may just access the target cell once an additional CHO execution condition is met (e.g., the handover preparation and execution phases may be decoupled). The condition may be configured by the source node. With the CHO, the CHO command can be sent early, when the UE is still served in the source cell, without risking an early access to the target cell. As a result, the number of radio link failures (RLFs) and handover failures (HoFs) may be reduced when using CHO.

Dual active protocol stack (DAPS) handover may reduce the service interruption that is experienced during a non-conditional handover procedure, in particular for downlink (DL). In DAPS, each of the source and target cells may have a full L2 protocol stack with its own security key for ciphering and deciphering of the packet data convergence protocol (PDCP) service data units (SDUs). In addition, to avoid a hard handover (e.g., detaching from serving cell before establishing a radio link to target cell) causing service interruption, the UE currently served by the source cell may establish an additional radio link with respect to the target cell before detaching the radio link of the source cell. As a result, for some time before releasing the connection to the source cell, the UE may be able to exchange data with both, source and target nodes. As a prerequisite for DAPS handover, the UE may have to have a dual transceiver architecture (2 radio frequency (RF) frontends) to maintain two simultaneous connections to the source and target node. DAPS handover may not be configured when the UE is configured with sidelink, and a UE may not be configured with both handover procedures (CHO and DAPS) simultaneously.

In a DAPS handover, after receiving a handover command, the UE may continue exchanging user data with a source cell (controlled by a source node), even when sending the random access channel (RACH) preamble to the target cell (controlled by the target node). Received user data may be ciphered by a key of the source cell. When the UE completes the random access successfully to the target cell (e.g., the UE receives a RACH response (RAR) in the case of contention free random access (CFRA), or physical downlink control channel (PDCCH) addressed to cell radio network temporary identifier (C-RNTI) in the case of contention based random access (CBRA)), the UE may switch the uplink (UL) user plane transmission from the source cell to the target cell. That is, after the UL switch, the UE may start to send new PDCP SDUs and the PDCP SDUs for which the successful delivery has not been confirmed by lower layers to the target cell. However, other UL transmissions towards the source cell (e.g., hybrid automatic repeat request (HARQ) and radio link control (RLC) (re)transmissions, HARQ feedback, RLC/PDCP status report, channel state information (CSI) measurements, etc.) may be continued.

After completing the access to the target cell, the UE may receive DL user data with source and target cell that is ciphered with different security keys. The UE may apply the security keys of the target cell for uplink (UL) transmission on physical uplink shared channel (PUSCH). After the UE has established a new radio link with the target cell, the target cell may send a handover success indication to the source cell which in turn may provide a sequence number (SN) status transfer message to the target cell. Upon receiving the SN status transfer message, the target cell can forward the buffered UL packets received from the UE to the user plane function (UPF). The target cell may send an explicit message for the UE to release the source link and path switch may be performed which may complete the handover.

In non-conditional handover, CHO and DAPS handover mechanisms, the UE cannot exchange UL and DL user plane packets with the target cell before it completes the random access procedure and/or handover execution to the target cell. In other words, the UE cannot exchange UL and DL user plane packets with the target cell before transmitting the PRACH preamble, receiving the RACH response, and sending an RRC reconfiguration complete message. Moreover, the UL transmission and DL reception to the target cell may be further delayed if the random access does not succeed from the first attempt. FIG. 1 illustrates an example signal diagram 100 where interruption time occurs during a handover. As illustrated in FIG. 1, a UE may send a measurement report to a source node (at 102), the source node may send a handover request to a target node (at 104), the target node may send a handover request ACK (at 106), and the source node may send a RRC reconfiguration to the UE (at 108). The source node may send a SN status transfer message (at 110), and may forward data (at 112). Three synchronizations (including PRACH preambles) may be attempted from the UE to the target node (at 114, 116, and 118), the target node may send a RACH response (at 120), the UE may send a RRC reconfiguration complete (at 122), and the UE and the target node may exchange user data (at 124).

In the signal diagram 100, the UE fails to access the target cell and receive a RAR in the first two RACH attempts (at 114 and 116). The interruption time may be started upon receiving the handover command in the RRC reconfiguration at 108 and may be increased each time the transmission of the PRACH preamble and reception of RAR fails. As such, there is a problem as to how to reduce the interruption time in a handover without 1) depending on the successful completion of the random access or handover execution to initiate the UL and DL transmission to the target cell; and 2) relying on the radio link of the source cell (as in DAPS) which may be expected to be weak at the time of handover and which may involve another network entity (source node) than the target node of the handover.

Figure 2:
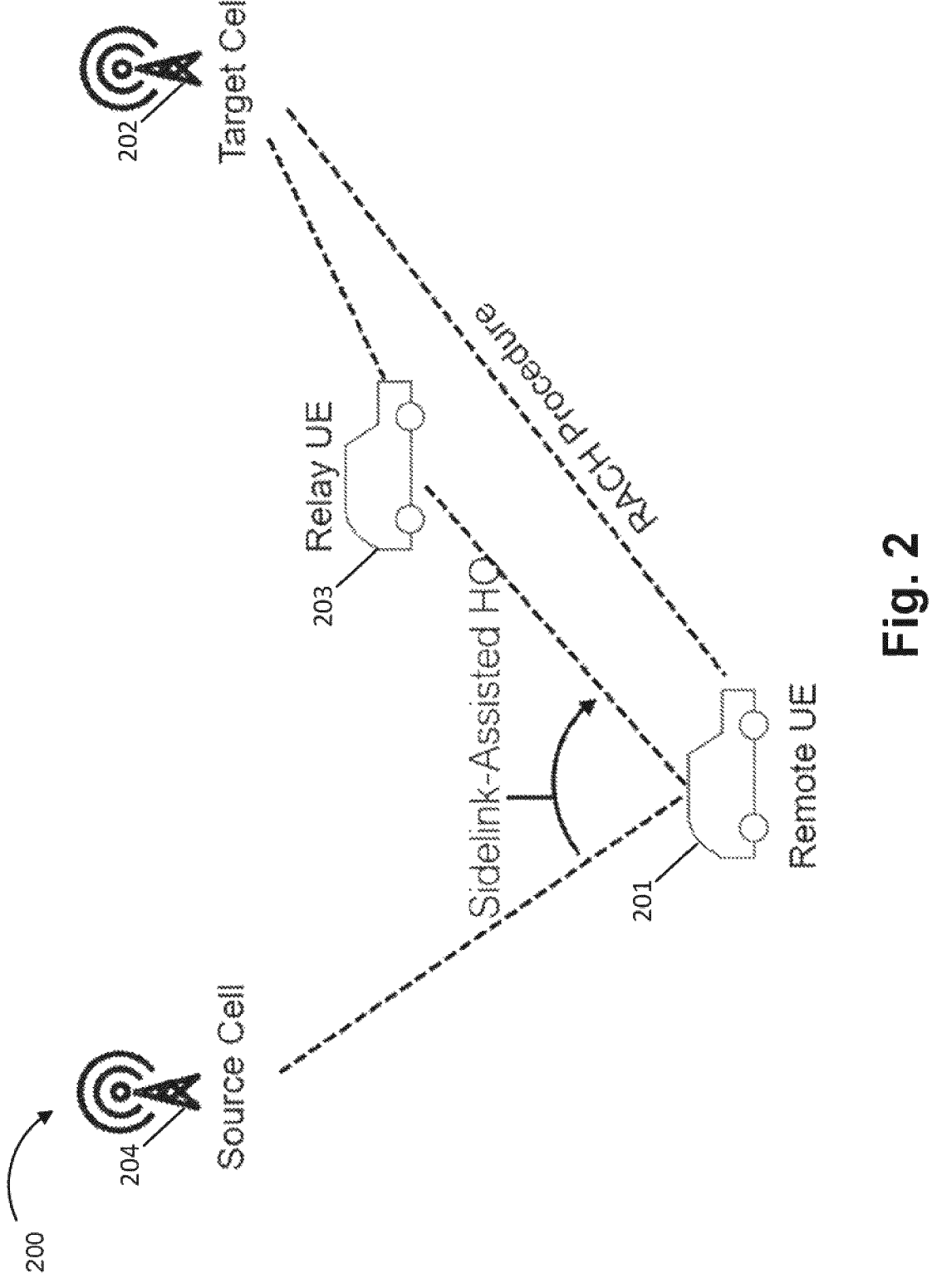
FIG. 2 illustrates an example of a sidelink-assisted handover, according to some embodiments.

Some embodiments described herein may provide for reducing handover interruption time using sidelink communication. For example, in FIG. 2, the handed-over (remote) UE 201 may exchange UL and DL data with the target cell 202 via the additional or assisting link to another relay UE 203 while the remote UE performs the random access procedure (RACH procedure) and may establish its own direct radio link to the target cell 202. In this way, the transmission of the UL packets and DL reception to or from the target cell may be de-coupled from the random access procedure as illustrated by the example system diagram 200 in FIG. 2, which may reduce the interruption time of the user plane during the handover.

In certain embodiments, the remote UE 201 may have an already active sidelink connection with a relay UE (connected to the target cell) when sending to the serving cell a measurement report initiating the handover preparation. The source node 204 may forward the sidelink-related information received from the IE 201 in, e.g., a measurement report to the target node 202 and may request the target node to prepare a (conditional) sidelink-assisted handover command. After decoding and processing the (conditional) handover command, the UE may inform the target cell via the relay UE that it is ready to exchange user plane packets while performing random access (while waiting for sending a PRACH preamble and receiving the RACH response (RAR)). The UE may exchange user plane packets with the target cell via the relay UE while completing the handover execution.

In certain embodiments, the remote UE 201 may not have an active sidelink with a relay UE 203 when sending the measurement report initiating the handover preparation. In this case, the remote UE 201 may have to establish the sidelink with the relay UE 203 served by the target cell 202 before executing the target cell configuration containing the handover command. The source node serving the source cell 204 may forward the sidelink-related information received from the UE in, e.g., a measurement report to the target node and may request the target node serving the target cell 202 to prepare a conditional sidelink-assisted handover command, e.g., that is associated with a CHO execution condition. The target cell 202 may indicate, to the remote UE 201, a subset of the reported relay UEs from which the remote UE may select to establish the sidelink communication before the CHO execution condition is met. By means of network configuration, the preparation of the target cell may be performed early to allow enough time for the UE to establish the sidelink communication before the CHO execution condition is met. One advantage of certain embodiments is that the remote UE can maintain just a single PDCP entity with one ciphering and header (de-)compression layer as just one network target node may be involved instead of two as in DAPS, which can reduce the implementation complexity at the UE. Moreover, the remote UE may be able to exchange not only DL but also UL data with the target cell even before the random access is started. This may be because, according to certain embodiments, the remote UE does not need to rely on receiving the timing advance received from the target cell to start the UL transmission. Thus, certain embodiments may provide similar performance gains as DAPS with reduced complexity since a user equipment does not require a dual transceiver architecture.

Figure 3A:
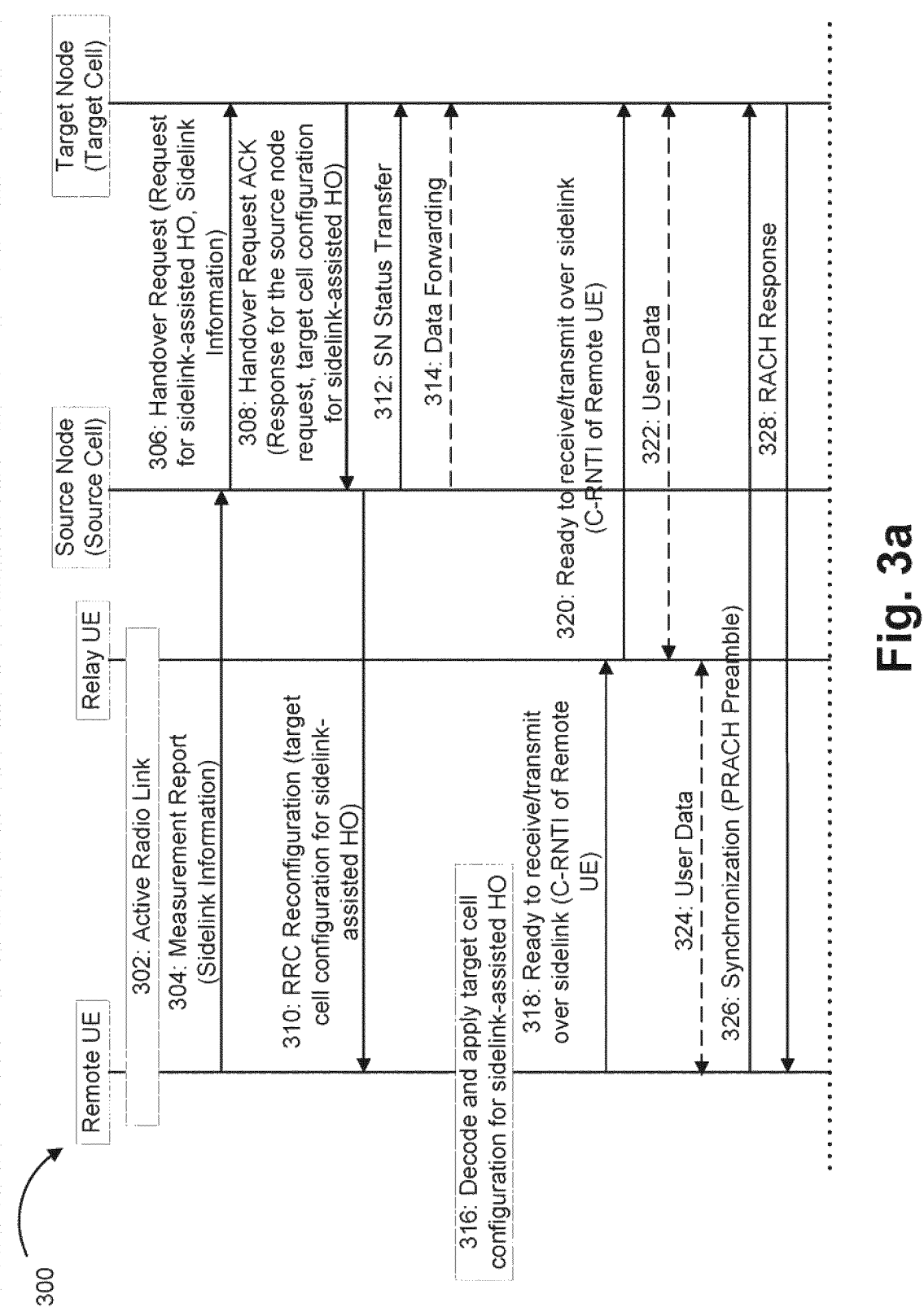
FIG. 3*a* illustrates a portion of an example signal diagram for an example sidelink-assisted handover in the context of a non-conditional handover, according to some embodiments.
Figure 3B:
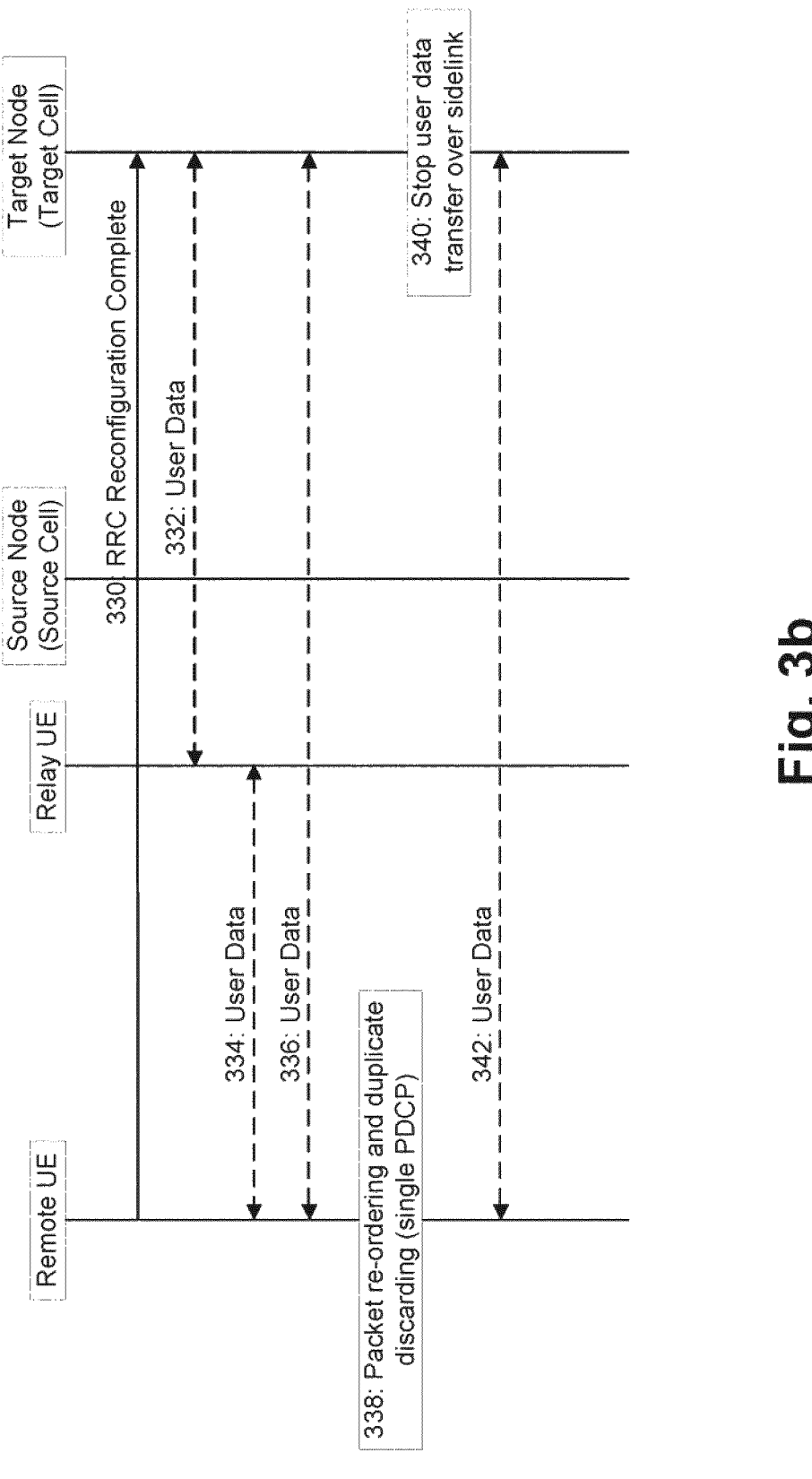
FIG. 3*b* illustrates another portion of the example of the example sidelink-assisted handover in the context of the non-conditional handover, according to some embodiments.

FIGS. 3a and 3b illustrate an example signal diagram 300 for a sidelink-assisted handover in the context of a non-conditional handover, according to some embodiments. The example illustrated in FIGS. 3a and 3b are in the context of a non-conditional handover where the remote UE may be served by the source cell and may have an active link with a relay UE that is served by the target cell. As illustrated in FIG. 3a, the signal diagram 300 includes a remote UE, a relay UE, a source node that controls a source cell, and a target node that controls a target cell.

As illustrated at 302, there may be an active radio link between the remote UE and the relay UE. As illustrated at 304, the remote UE may send a measurement report that includes sidelink information to the source node. For example, the measurement report may include an indication that the remote UE has an active sidelink communication with a relay UE that is served by a target cell whose measurements are included in the measurement report. The UE may provide the indication for the relevant target cells which have triggered the transmission of the measurement report. Additionally, or alternatively, the measurement report may include an identifier (e.g., a C-RNTI) of the relay UE that can help the target cell to identify the reported relay UE. Additionally, or alternatively, the measurement report may include PC5 radio link quality and strength measurements of the side link between the remote UE and the relay UE. Additionally, or alternatively, the measurement report may include an indication that the relay UE is able to support the remote UE in forwarding the user plane packets from the target cell during the handover execution. The decision of the relay UE to accept can be based on its battery level, capability, etc. The indication that the relay UE is able to support the remote UE may be a value, e.g., between 1 and 10, where 1 may indicate that the relay UE is in optimal condition to support the remote UE (e.g., high battery level, low mobility) and 10 may indicate that the relay UE is in a non-optimal condition (e.g., low battery, high mobility).

As illustrated at 306, the source node may transmit, to the target node, a handover request that includes a request for sidelink-assisted handover (HO), and that includes the sidelink information. For example, based on the received measurement report at 304, the source cell may determine whether to trigger a sidelink-assisted HO or another handover procedure (a non-conditional handover, CHO, or DAPS handover). If the interruption time reduction is needed for the services provided by the remote UE, and in case the measurement of the source link is weak, the source cell may determine to trigger the sidelink-assisted handover instead of DAPS handover. In case of sidelink-assisted HO, the source cell may send, at 306, a request for the target cell to perform a sidelink-assisted handover and may forward the sidelink information received from the UE to the target node.

As illustrated at 308, the target node may transmit, to the source node, a handover request ACK that may include a response for the source node request, and that may include a target cell configuration for the sidelink-assisted HO. For example, the target cell may accept or reject the HO request of the source cell to perform sidelink-assisted handover. If the target cell accepts, it may determine a target cell configuration for sidelink-assisted handover. In certain embodiments, before accepting the request for sidelink-assisted handover, the target cell may determine whether the relay UE is able to support the remote UE in forwarding the user plane packets from the target cell during the handover execution (this can be an alternative option for the indication that the relay UE is able to support the remote UE sent by the remote UE at 304). If the relay UE rejects the request of the target cell, then the target cell can determine to use a DAPS handover or a non-conditional handover and may prepare a corresponding command.

As illustrated at 310, the source node may send, to the remote UE, a RRC reconfiguration that includes a target cell configuration for sidelink-assisted handover. For example, the configuration may include the configuration determined by the target node and received by the source node at 308. As illustrated at 312, the source node may transmit, to the target node, a SN status transfer message. As illustrated at 314, the source node may forward data to the target node. As illustrated at 316, the remote UE may decode and apply the configuration for the sidelink-assisted handover.

As illustrated at 318, the remote UE may transmit, to the relay UE, an indication that the remote UE is ready to receive and/or transmit over a sidelink connection. For example, the message may include an identifier (e.g., a C-RNTI) of the remote UE to help the target cell identify the remote UE. As illustrated at 320, the relay UE may transmit, to the target node, an indication that the remote UE is ready to receive and/or transmit over the sidelink connection. In this way, after decoding and applying the target cell configuration, the UE may indicate to the target cell that it is ready to receive and transmit data via the sidelink. In certain embodiments, the target cell can start to forward the user plane packets beforehand to the relay UE which may buffer and provide the user plane packets to the remote UE when it receives the indication (in this case, the operations at 322 can start before the indication at 320 is received by target node), which may reduce latency for delivery of user plane packets.

As illustrated at 322, the relay UE and the target node may exchange user data. As illustrated at 324, the remote UE and the relay UE may exchange user data. In this way, the remote UE and target cell may exchange user plane data via the relay UE while the random access is performed to the target cell. As illustrated at 326, the remote UE may transmit, to the target node, a synchronization message (e.g., that includes a PRACH preamble). As illustrated at 328, the target node may transmit, to the remote UE, a RACH response.

Turning to FIG. 3b, and as illustrated at 330, the remote UE may transmit, to the target node, an RRC reconfiguration complete message. As illustrated at 332, the relay UE and the target node may exchange user data. As illustrated at 334, the remote UE and the relay UE may exchange user data and, at 336, the remote UE and the target node may exchange user data directly. As illustrated at 338, the remote UE may perform packet re-ordering and may duplicate discarding (e.g., using a single PDCP). As illustrated at 340, the target node may stop user data transfer over the sidelink connection. As illustrated at 342, the remote UE and the target node may exchange user data directly. In this way, after completing the random access and sending the RRC reconfiguration complete message, the UE may start to receive user data from the (direct) link of the target cell and sidelink. The UE may perform packet re-ordering and duplicate discarding using a single PDCP layer which may be configured by the target cell. In certain embodiments, the target cell may stop the user data transfer over the sidelink after the radio link of the target cell is established. The UE may receive user plane packets from the target cell using just the direct link.

According to certain embodiments illustrated in, and described with respect to, FIGS. 3a and 3b the interruption time includes RRC procedure delay (which may be 10 ms, for example) and UE processing (e.g., 20 ms) between 310 and 316, and the transmission at 318 and 320. For example, the UE may start the UL transmission immediately after, or with, the transmission of the indication at 318. Thus, interruption time may be reduced. For example, the resulting interruption time may be much less than ~73 ms and 56 ms for intra-frequency frequency range 1 (FR1) and frequency range 2 (FR2) non-conditional handovers, respectively.

As described above, FIGS. 3a and 3b are provided as examples. Other examples are possible, according to some embodiments.

Figure 4A:
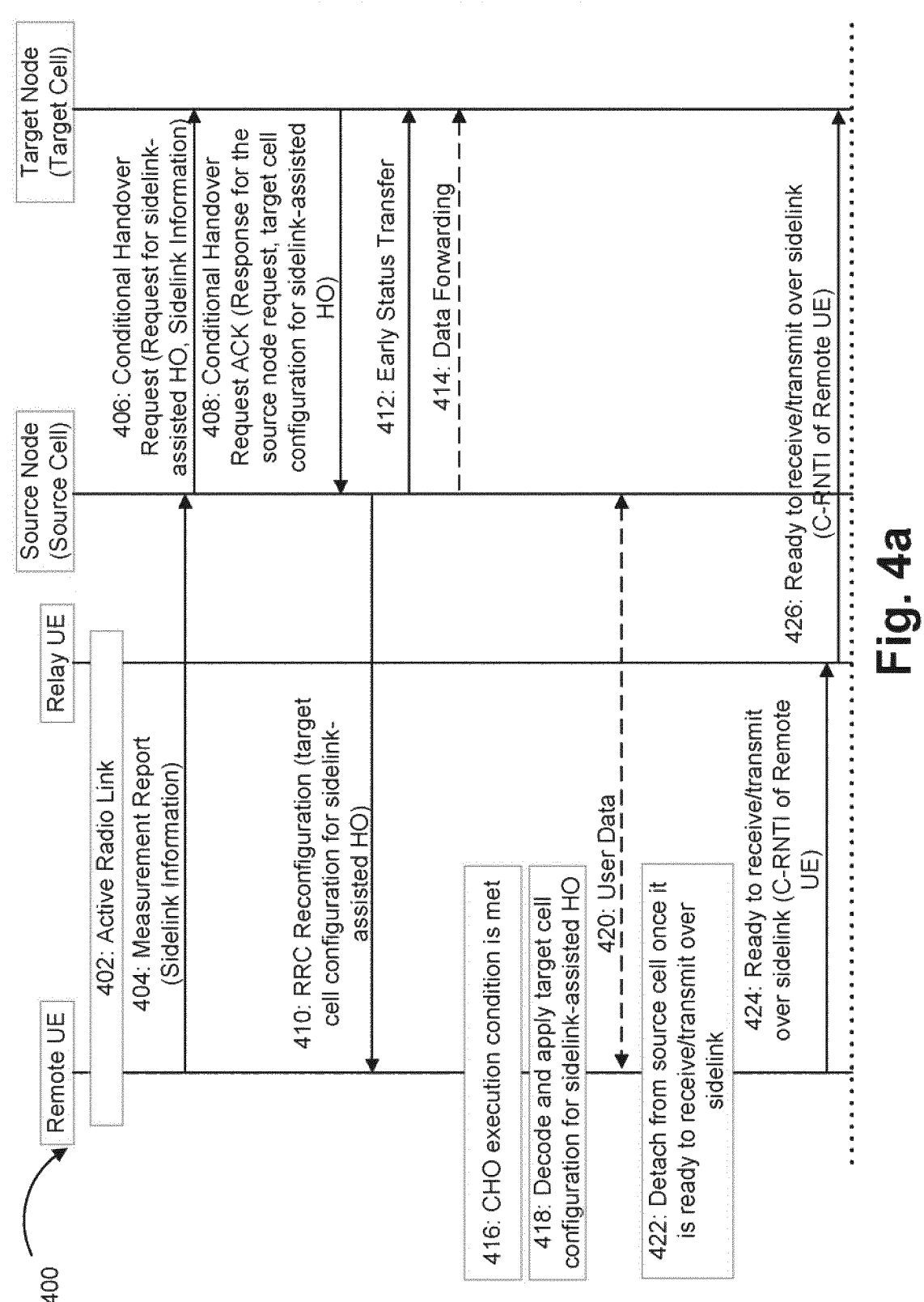
FIG. 4*a* illustrates a portion of an example signal diagram for a first example sidelink-assisted handover in the context of a conditional handover, according to some embodiments.
Figure 4B:
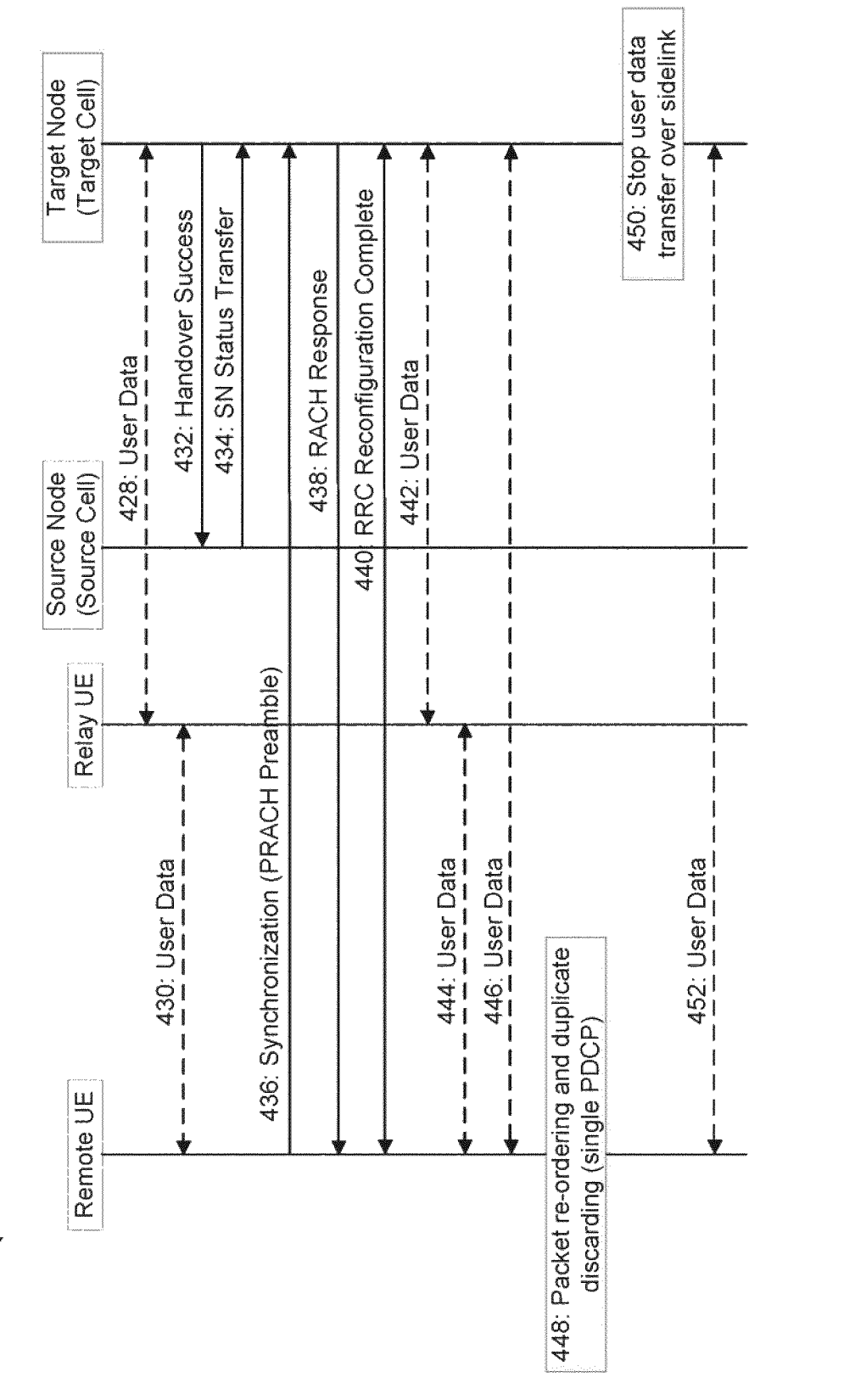
FIG. 4*b* illustrates another portion of the example signal diagram for the first example sidelink-assisted handover in the context of the conditional handover, according to some embodiments.

FIGS. 4a and 4b illustrate an example signal diagram 400 for a first example sidelink-assisted handover in the context of a conditional handover, according to some embodiments. For example, FIGS. 4a and 4b illustrate an example in the context of a conditional handover where the remote UE is served by the source cell via a direct link and has an active connection with the relay UE that is served by the target cell.

The operations illustrated at 402, 404, 406, 408, 410, 412, and 414 may be similar to the operations at 302, 304, 306, 308, 310, 312, and 314 of FIG. 3a, except that the request and ACK at 406 and 408 may be for a conditional handover rather than a non-conditional handover and the source node may send an early status transfer message at 412 rather than a SN status transfer message.

As illustrated at 416, the remote UE may determine that a CHO execution condition is met. The operations illustrated at 418 may be similar to the operations illustrated at 316 of FIG. 3a. As illustrated at 420, the remote UE and the source node may exchange user data. As illustrated at 422, the UE may detach from the source cell once it is ready to receive and/or transmit over the sidelink connection. The operations illustrated at 424 and 426 of FIG. 4a and at 428 and 430 of FIG. 4b may be similar to the operations illustrated at 318, 320, 322, and 324, respectively, of FIG. 3a. As illustrated at 432, the target node may transmit, to the source node, a handover success indication and, at 434, the source node may transmit, to the target node, a SN status transfer message. The operations illustrated at 436, 438, 440, 442, 444, 446, 448, 450, and 452 of FIG. 4b may be similar to the operations at 326, 328, 330, 332, 334, 336, 338, 340, and 342, respectively, of FIGS. 3a and 3b.

In this way, the UE may not detach from the source cell before decoding and applying the target cell configuration and becoming ready to receive and/or transmit over the sidelink. This may save additional interruption time as the UE can continue to receive the data from the source cell. As such, the UE may experience an interruption time of just a couple of ms that may be needed to transmit the indication to the target cell, i.e., the target cell can start forwarding the user plane packets after receiving the indication at 318 and 320. As for UL, the UE may start the UL transmission immediately after, or with, the transmission of the indication at 318. In addition, the source cell may perform early data forwarding for CHO.

As described above, FIGS. 4a and 4b are provided as examples. Other examples are possible, according to some embodiments.

Figure 5A:
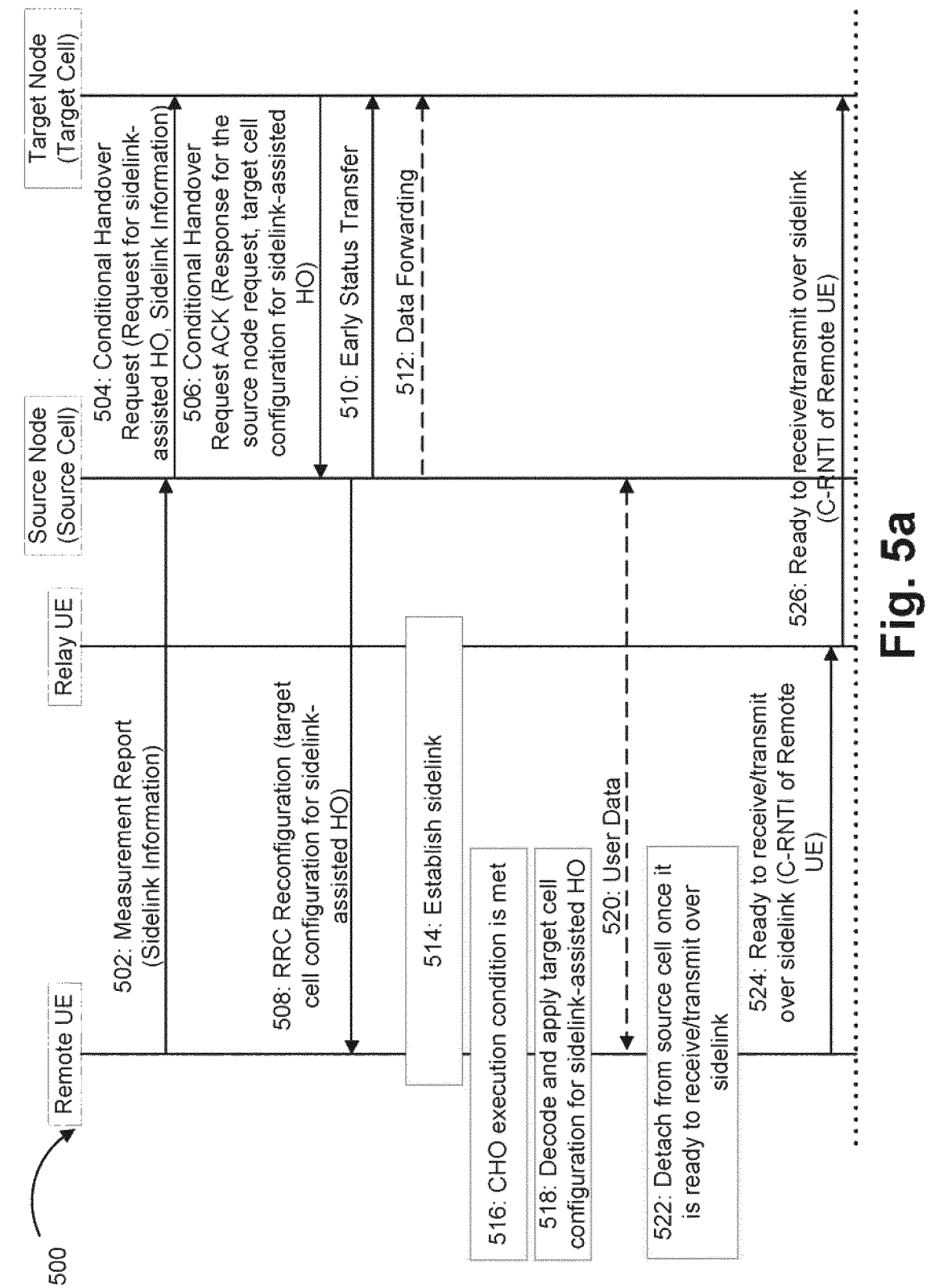
FIG. 5*a* illustrates a portion of an example signal diagram for a second example sidelink-assisted handover in the context of a conditional handover, according to some embodiments.
Figure 5B:
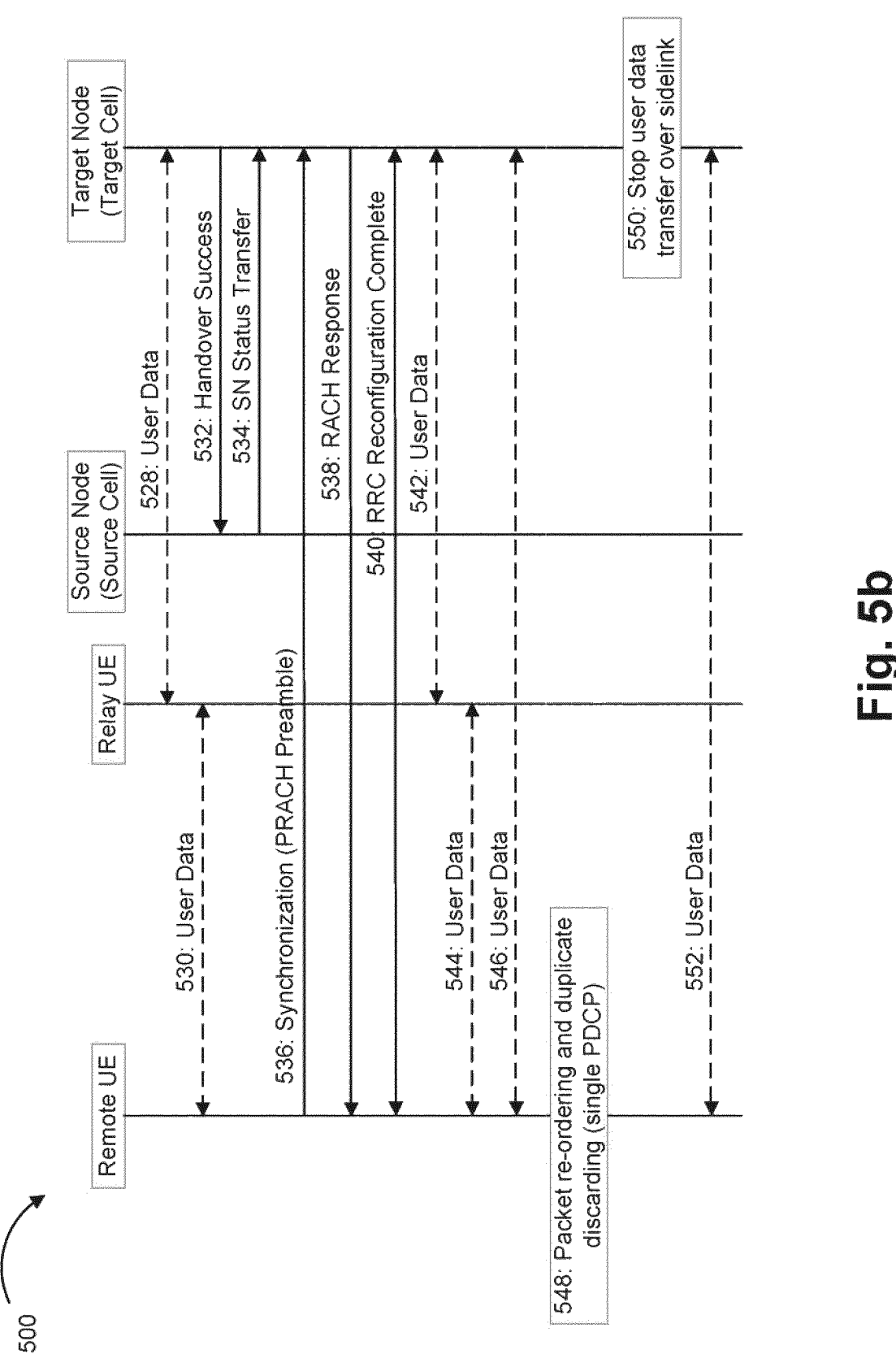
FIG. 5*b* illustrates another portion of the example signal diagram for the second example sidelink-assisted handover in the context of the conditional handover, according to some embodiments.

FIGS. 5a and 5b illustrate an example signal diagram 500 for a second example sidelink-assisted handover in the context of a conditional handover, according to some embodiments. The example signal diagram 500 may illustrate an example where a remote UE is served by a source cell and a relay UE by a target cell. In contrast to certain embodiments of FIGS. 3a-4b, the remote UE does not have an active sidelink connection when sending the measurement report. As illustrated in FIGS. 5a and 5b, the example signal diagram 500 includes a remote UE, a relay UE, a source node, and a target node. The operations at 502, 504, 506, 508, 510, and 512 may be similar to the operations at 404, 406, 408, 410, 412, and 414, respectively, of FIG. 4a. At 502, the measurement report may additionally include a list of potential relay UE candidates that are served by a target cell whose measurements are included in the measurement report rather than an indication that the remote UE has an active sidelink. For example, the UE may provide the list of potential relay UE candidates for the target cells which have triggered the transmission of the measurement report. The UE may provide the list using a discovery procedure. As illustrated at 514, the remote UE and the relay UE may establish a sidelink connection. As part of the (target cell) configuration for sidelink-assisted handover, the target cell may indicate to the remote UE a subset of the reported relay UEs from which the remote UE may select to establish the sidelink communication established at 514. For example, the target cell may make its decision based on the measurements between the target cell and relay UE candidate (which may be available at the target cell) and the measurements between the remote UE and relay UE candidate that is forwarded from the source cell. In certain embodiments, if the establishment of the sidelink fails at 416, the UE can either 1) inform the source cell which may reconfigure the UE later with a DAPS handover or 2) perform a non-conditional CHO without relay node assistance.

The operations illustrated at 516, 518, 520, 522, 524, and 526 may be similar to the operations at 416, 418, 420, 422, 424, and 426, respectively, of FIG. 4a. Turning to FIG. 5b, the operations illustrated at 528, 530, 532, 534, 536, 538, 540, 542, 544, 546, 548, 550, and 552 may be similar to the operations at 428, 430, 432, 434, 436, 438, 440, 442, 444, 446, 448, 450, and 452, respectively, of FIG. 4b.

As described above, FIGS. 5a and 5b are provided as examples. Other examples are possible, according to some embodiments.

FIG. 6 illustrates an example flow diagram of a method 600, according to some embodiments. For example, FIG. 6 may illustrate example operations of a network node (a source network node) (e.g., apparatus 10 illustrated in, and described with respect to, FIG. 9a, or a source node serving the source cell 204 in FIG. 2). Some of the operations illustrated in FIG. 6 may be similar to some operations shown in, and described with respect to, FIGS. 2-5*b*.

In an embodiment, the method 600 may include, at 602, sending, by a source network node to a target network node, a request for a relay node-aided handover of a user equipment from a first direct link with the source network node to a second direct link with the target network node, e.g., in a manner similar to that at 306 of FIG. 3*a*, 406 of FIG. 4*a* or 504 of FIG. 5*a*. The method 600 may include, at 604, receiving an acknowledgement associated with the request, e.g., in a manner similar to that at 308 of FIG. 3*a*, 408 of FIG. 4*a* or 506 of FIG. 5*a*.

The method 600 illustrated in FIG. 6 may include one or more additional aspects described below or elsewhere herein. In some embodiments, the method 600 may include receiving information related to a sidelink between the user equipment and the relay node from the user equipment, e.g., in a manner similar to that at 304 of FIG. 3*a* and including the information in the request.

As described above, FIG. 6 is provided as an example. Other examples are possible according to some embodiments.

Figure 7:
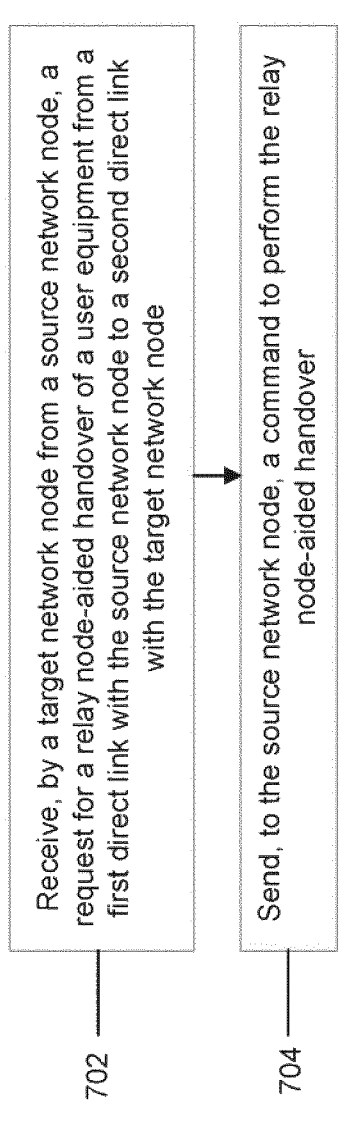
FIG. 7 illustrates an example flow diagram of a method, according to some embodiments.

FIG. 7 illustrates an example flow diagram of a method 700, according to some embodiments. For example, FIG. 7 may illustrate example operations of a network node (a target network node) (e.g., apparatus 10 illustrated in, and described with respect to, FIG. 9*a*, or a target network node serving the target cell 202 in FIG. 2). Some of the operations illustrated in FIG. 7 may be similar to some operations shown in, and described with respect to, FIGS. 2-5*b*.

In an embodiment, the method 700 may include, at 702, receiving, by a target network node from a source network node, a request for a relay node-aided handover of a user equipment from a first direct link with the source network node to a second direct link with the target network node, e.g., in a manner similar to that at 306 of FIG. 3*a*. The method 700 may include, at 704, sending, to the source network node, a command to perform the relay node-aided handover, e.g., in a manner similar to that at 308 of FIG. 3*a*.

The method 700 illustrated in FIG. 7 may include one or more additional aspects described below or elsewhere herein. In some embodiments, the sending at 704 may include sending the command in a target cell configuration message. In some embodiments, the command may include a list of candidate relay nodes for the user equipment to choose for the relay node-aided handover. In some embodiments, the method 700 may include receiving an indication from the user equipment via the relay node prior to receiving a random access message from the user equipment, where the indication indicates that the user equipment is ready for data packet communication with the target network node via the relay node, e.g., in a manner similar to that at 318 and 320 of FIG. 3*a*, 424 and 426 of FIG. 4*a*, or 524-526 of FIG. 5*a*.

In some embodiments, the method 700 may include, based on the indication, transmitting a downlink data packet to the user equipment via the relay node and/or receiving an uplink data packet from the user equipment via the relay node, prior to completion of the handover, e.g., in a manner similar to that at 322-324 of FIG. 3*a*, 428-430 of FIG. 4*b*, or 528-530 of FIG. 5*b*. In some embodiments, the method 700 may include switching user plane data packet transmission for the user equipment from a link via the relay node to the direct link with the user equipment, after receiving a message from the user equipment indicating completion of the handover. In some embodiments, the target network node may perform user plane data packet transmission for the user equipment using both an indirect link via the relay node and a direct link with the user equipment for a time period, after receiving a message from the user equipment indicating completion of the handover. In some embodiments, the method 700 may include sending a request to the relay node for assistance during the relay node-aided handover.

As described above, FIG. 7 is provided as an example. Other examples are possible according to some embodiments.

FIG. 8 illustrates an example flow diagram of a method 800, according to some embodiments. For example, FIG. 8 may illustrate example operations of a UE (e.g., apparatus 20 illustrated in, and described with respect to, FIG. 9*b*, or remote UE 201 in FIG. 2). Some of the operations illustrated in FIG. 8 may be similar to some operations shown in, and described with respect to, FIGS. 2-5*b*.

In an embodiment, the method 800 may include, at 802, receiving, by a user equipment, a command to handover from a first direct link with a source cell (e.g., 204 in FIG. 2) to a second direct link with a target cell (e.g., 202 in FIG. 2), e.g., in a manner similar to that at 310 of FIG. 3*a*, 410 of FIG. 4*a*, or 508 of FIG. 5*a*. The method 800 may include, at 804, based on the command, sending a message to the target cell via a relay node, where the message indicates a readiness of the user equipment to transmit an uplink data packet to or receive a downlink data packet from the target cell via the relay node, e.g., in a manner similar to that at 318 and 320 of FIG. 3*a*. The method 800 may include, at 806, before completing the handover: transmitting the uplink data packet to and/or receiving the downlink data packet from the target cell via the relay node (e.g., 203 in FIG. 2), e.g., in a manner similar to that at 322 and 324 of FIG. 3*a*, and performing a random access to the target cell, e.g., in a manner similar to that at 326 and 328 of FIG. 3*a*.

The method 800 illustrated in FIG. 8 may include one or more additional aspects described below or elsewhere herein. In some embodiments, the message sent at 804 may include an identifier for the user equipment (e.g., a C-RNTI, which may be included in the command received from the target cell via the source cell). In some embodiments, the transmitting of the uplink data packet to the target cell may comprise starting transmission prior to initiating a random access procedure to the target cell, as shown in FIG. 3*a*. In some embodiments, the method 800 may include detaching from the source cell when the user equipment is ready to send the message to the target cell. In some embodiments, the method 800 may include communicating with the target cell using both the second direct link with the target node and a sidelink via the relay node, after completing the handover, e.g., in a manner similar to that at 332, 334, and 336 of FIG. 3*b*.

In some embodiments, the method 800 may include performing the following after completing the handover: stopping the transmitting of the uplink data packet to and/or the receiving of the downlink data packet from the target cell via the relay node, and communicating with the target cell on the second direct link, e.g., in a manner similar to that at 342 of FIG. 3*b*. In some embodiments, the method 800 may include establishing a sidelink with the relay node before an execution condition of the handover is met, e.g., in a manner similar to that at 514 of FIG. 5*a*, or before sending the message, e.g., in a manner similar to that at 302 of FIG. 3*b*. In some embodiments, the method 800 may include informing the source cell if the user equipment fails to establish a sidelink with the relay node or if the sidelink with the relay node becomes unavailable before the execution condition of the handover is met.

As described above, FIG. 8 is provided as an example. Other examples are possible according to some embodiments.

Figure 9B:
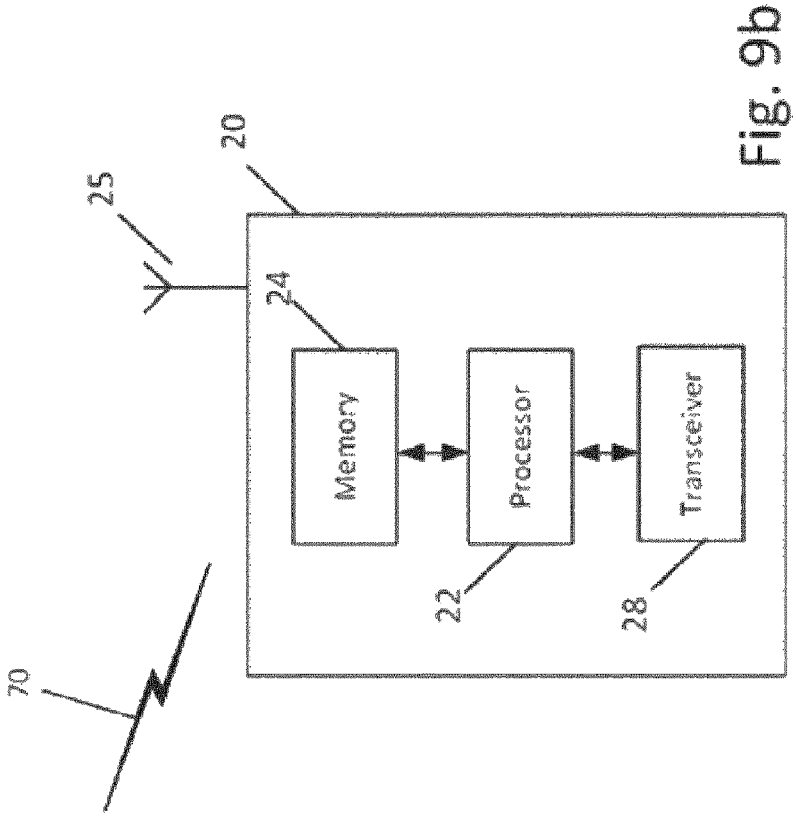
FIG. 9*b* illustrates an example block diagram of an apparatus, according to another embodiment.
Figure 9A:
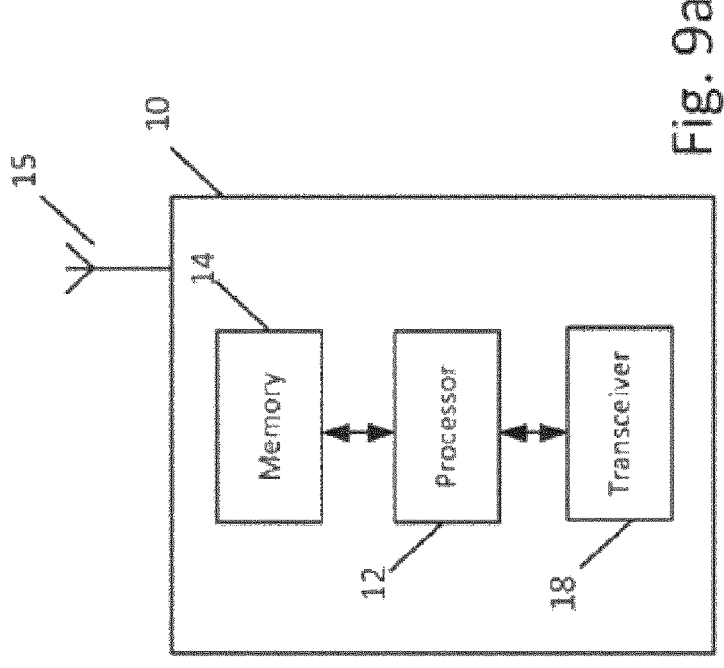
FIG. 9*a* illustrates an example block diagram of an apparatus, according to an embodiment.

FIG. 9*a* illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a wireless local area network (WLAN) access point, associated with a radio access network, such as a LTE network, 5G or NR. In some example embodiments, apparatus 10 may be an eNB in LTE or gNB in 5G.

It should be understood that, in some example embodiments, apparatus 10 comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9*a*.

As illustrated in the example of FIG. 9*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, universal serial bus (USB) drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultra-wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or radio access network (RAN) node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 2-7. For instance, apparatus 10 may be controlled by memory 14 and processor 12 to perform the methods of FIGS. 6 and/or 7.

FIG. 9b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE advanced (LTE-A), NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9b.

As illustrated in the example of FIG. 9b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as orthogonal frequency divisional multiple access (OFDMA) symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 2-5b and 8. For instance, in one embodiment, apparatus 20 may be controlled by memory 24 and processor 22 to perform the method of FIG. 8.

In some embodiments, an apparatus (e.g., apparatus 10 and/or apparatus 20) may include means for performing a method or any of the variants discussed herein, e.g., a method described with reference to FIGS. 6-8. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is an enhanced handover procedure that may reduce the interruption time without relying on the radio link quality and/or strength of the source cell which is being handed over. This may help to provide a high reliability for the services provided by the remote UE. Another benefit of some example embodiments is simpler UE implementation as the UE may have to maintain just one PDCP entity with one ciphering and header (de-)compression layer for the target cell. Another benefit of some example embodiments is that the UE can start to send UL data to the target cell via the relay UE before performing random access to target cell and receiving the timing advance. Another benefit of some example embodiments is that the user plane packet may not have to be necessarily duplicated from source and target cell as the target cell or node can decide to use just the direct link (or switch immediately the user plane transmission from the sidelink to the direct link) when the random access is completed and the radio link of the target cell is set up. Accordingly, the use of some example embodiments results in improved functioning of communications networks and their nodes and, therefore constitute an improvement at least to the technological field of interruption time reduction during handover, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural wording is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

3GPP The 3rd Generation Partnership Project
CBRA Contention Based Random Access
CE Control Element
CFRA Contention Free Random Access
C-RNTI Cell Radio Network Temporary Identifier
DAPS Dual Active Protocol Stack
DL Downlink
gNB NR base station
HARQ Hybrid Automatic Repeat Request
HO Handover
ID Identity
LTE Long Term Evolution
MAC Medium Access Control
NR New Radio
PCI Physical Cell Id
PDCCH Physical Downlink Control Channel
PDCP Packet Data Convergence Protocol
PDU Packet Data Unit
PUCCH Physical Uplink Control Channel
PUSCH Physical Uplink Shared Channel
RACH Random Access Channel
RLC Radio Link Control
RRC Radio Resource Control
RSRP Reference Signal Received Power
SDU Service Data Unit
SL Sidelink
UE User Equipment
UL Uplink

We claim:

1. An apparatus, comprising:
at least one processor; and
at least one memory including computer program code,
wherein the at least one memory and the computer program code are configured to, with the at least one processor, cause the apparatus at least to:
send, to a target network node, a request for a relay node-aided handover of a user equipment from a first direct link with the apparatus to a second direct link with the target network node; and
receive an acknowledgement associated with the request.
2. The apparatus of claim 1, wherein the at least one memory and the computer program code are configured to, with the at least one processor, further cause the apparatus at least to:

receive information related to a sidelink between the user equipment and the relay node from the user equipment; and
include the information in the request.
3. An apparatus, comprising:
at least one processor; and
at least one memory including computer program code,
wherein the at least one memory and the computer program code are configured to, with the at least one processor, cause the apparatus at least to:
receive, from a source network node, a request for a relay node-aided handover of a user equipment from a first direct link with the source network node to a second direct link with the apparatus; and
send, to the source network node, a command to perform the relay node-aided handover.
4. The apparatus of claim 3, wherein the at least one memory and the computer program code are configured to, with the at least one processor, further cause the apparatus, when sending the command, at least to:
send the command in a target cell configuration message.
5. The apparatus of claim 3, wherein the command comprises a list of candidate relay nodes for the user equipment to choose for the relay node-aided handover.
6. The apparatus of claim 3, wherein the at least one memory and the computer program code are configured to, with the at least one processor, further cause the apparatus at least to:
receive an indication from the user equipment via the relay node prior to receiving a random access message from the user equipment, wherein the indication indicates that the user equipment is ready for data packet communication with the apparatus via the relay node.
7. The apparatus of claim 3, wherein the at least one memory and the computer program code are configured to, with the at least one processor, further cause the apparatus at least to:
receive an indication from the user equipment via the relay node prior to receiving a random access message from the user equipment, wherein the indication indicates that the user equipment is ready for data packet communication with the apparatus via the relay node, and
based on the indication, transmit a downlink data packet to the user equipment via the relay node and/or receive an uplink data packet from the user equipment via the relay node, prior to completion of the handover.
8. The apparatus of claim 3, wherein the at least one memory and the computer program code are configured to, with the at least one processor, further cause the apparatus at least to:
send a request to the relay node for assistance during the relay node-aided handover.

* * * * *